United States Patent
Aoyagi et al.

(10) Patent No.: US 9,531,802 B2
(45) Date of Patent: Dec. 27, 2016

(54) DATA TRANSMISSION AND RECEPTION SYSTEM

(75) Inventors: Hidetoshi Aoyagi, Tokyo (JP); Yoshihisa Hashimoto, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 156 days.

(21) Appl. No.: 14/354,157

(22) PCT Filed: Jun. 11, 2012

(86) PCT No.: PCT/JP2012/064931
§ 371 (c)(1),
(2), (4) Date: Apr. 25, 2014

(87) PCT Pub. No.: WO2013/069329
PCT Pub. Date: May 16, 2013

(65) Prior Publication Data
US 2014/0297735 A1    Oct. 2, 2014

(30) Foreign Application Priority Data

Nov. 10, 2011   (JP) .................................. 2011-246967

(51) Int. Cl.
*G06F 15/16* (2006.01)
*H04L 29/08* (2006.01)

(52) U.S. Cl.
CPC .......... *H04L 67/104* (2013.01); *H04L 67/108* (2013.01); *H04L 67/1063* (2013.01)

(58) Field of Classification Search
None
See application file for complete search history.

(56) References Cited

U.S. PATENT DOCUMENTS

| | | | | |
|---|---|---|---|---|
| 7,415,731 B2* | 8/2008 | Carpentier | ............ | H04L 67/108 705/51 |
| 7,444,421 B2* | 10/2008 | Katayama | ............. | H04L 1/0042 370/474 |
| 8,204,915 B2* | 6/2012 | Dolganow | ........ | G06F 17/30209 707/803 |
| 9,201,894 B2 | 12/2015 | Fukuda et al. | | |
| 2007/0124541 A1 | 5/2007 | Lang et al. | | |

(Continued)

FOREIGN PATENT DOCUMENTS

| | | |
|---|---|---|
| JP | 2003-203023 | 7/2003 |
| JP | 2004-046420 | 2/2004 |

(Continued)

OTHER PUBLICATIONS

Yeounoh Chung, "Torrent crawler: a tool for collecting information from BitTorrent networks," Master of Engineering project, Cornell University (Advisor: Bernard Wong and Emin Gun Sirer), May 20, 2009.

(Continued)

*Primary Examiner* — Umar Cheema
*Assistant Examiner* — John Fan
(74) *Attorney, Agent, or Firm* — Greenblum & Bernstein, P.L.C.

(57) ABSTRACT

When content data is split into multiple pieces of data and there is a request from a client terminal to download the content data, in addition to a transfer to the client terminal from a server that has the content data, the split-up data of the content data is transferred via a P2P communications network from other client terminals that have in a cache region the split-up data of the content data, and the content data is reconstructed within the client terminal, thereby enabling the realization of higher speed data transfer rates by using multiple paths while resolving bottlenecks where traffic is concentrated on the server.

5 Claims, 8 Drawing Sheets

(56) References Cited

U.S. PATENT DOCUMENTS

| | | | |
|---|---|---|---|
| 2007/0288593 A1* | 12/2007 | Wang | G06Q 20/123 709/217 |
| 2008/0133767 A1* | 6/2008 | Birrer | H04L 65/4076 709/231 |
| 2008/0270430 A1 | 10/2008 | Kobayashi | |
| 2009/0252134 A1* | 10/2009 | Schlicht | H04L 1/0015 370/338 |
| 2009/0287835 A1* | 11/2009 | Jacobson | H04L 67/104 709/229 |
| 2010/0211608 A1 | 8/2010 | Dolganow et al. | |
| 2010/0287301 A1* | 11/2010 | Kalmstrom | G06F 17/211 709/233 |
| 2012/0020238 A1* | 1/2012 | Suetsugu | H04L 51/04 370/252 |

FOREIGN PATENT DOCUMENTS

| | | |
|---|---|---|
| JP | 2005-107708 | 4/2005 |
| JP | 2008192129 | 8/2008 |
| JP | 2008-269527 | 11/2008 |
| JP | 2009-205197 | 9/2009 |
| JP | 2010033469 | 2/2010 |
| JP | 2011180820 | 9/2011 |

OTHER PUBLICATIONS

Korea Office action, mail date is May 21, 2015.

Yeounoh Chung, "Torrent Crawler: a Tool for collecting information from BitTorrent networks ", Final Projects CS 6464: Spring 2009 Advanced Distributed Storage Systems, XP055173982, Department of Computer Science, Cornell University, URL: http://www.cs.cornell.edu/courses/cs6464/2009sp/projects/ye336/final_doc.pdf , May 20, 2009.

Search report from E.P.O., mail date is Mar. 26, 2015.

International Search Report in PCT/JP2012/064931, mailed on Jul. 3, 2012.

Office Action dated Jul. 26, 2016 in Japanese Patent Application No. 2015-160888, along with English translation.

* cited by examiner

DATA TRANSMISSION AND RECEPTION SYSTEM

TECHNICAL FIELD

The present invention relates to a data transmission and reception system. Specifically, the present invention relates to a data transmission and reception system in which a server means configured by a plurality of server apparatuses and a plurality of client terminals are connected via a communication network, and data can be transmitted and received therebetween.

BACKGROUND ART

In the past, there is known a server-client system in which a server manages content data and a client terminal downloads the corresponding content data from the server when necessary. Such a server-client system, for example, is constructed in Internet to which computers are interconnected using an Internet protocol technology, or intranet in which it is used in an intra-organization network within a company or the like.

For example, in software development fields, a server apparatus unifies a configuration management of software or an update management of a file under development, and each client terminal connected to the server downloads a source file or content from the server apparatus and performs various editing operations on downloaded content when appropriate and necessary. Therefore, the use of the server-client system has the advantage that content data within the server can be always maintained up to date and can be shared with each client terminal.

Also, in the past, a peer to peer (hereinafter, referred to as P2P) communication technology is known as a communication technology that mutually connects information processing devices such as computers and transmits data to the other side device. In the P2P type communication, since each personal computer becomes equivalent and no dedicated server is required, a communication network can be relatively easily organized.

The P2P type communication is suitable for construction of a small-scale LAN using, for example, four to six personal computers, and has the advantage that can reduce traffic because transmission is directly performed to the other side.

Furthermore, for example, Patent Literature 1 discloses a communication technology that reduces traffic passing through a server, efficiently transmits content data between processing devices, and realizes smooth and diverse communications between users of the respective information processing device in a server-client system. According to the technology disclosed in Patent Literature 1, the transition from the client-server type connection to the P2P type connection can prevent traffic to the server from being concentrated on one station and can achieve optimization of traffic in a whole system.

CITATION LIST

Patent Literature

Patent Literature 1: JP 2003-203023 A

SUMMARY OF INVENTION

Technical Problem

As described above, in the conventional client-server system, the server unifies the management of content data and each client terminal appropriately downloads the content data and performs operations thereon, but a waiting time for data transmission from the server to the client terminal reduces the work efficiency of data handling processing as the amount of content data is larger. In particular, in a digital content industry to routinely handle a digital asset, including a terabyte-class video, if a download request from a client terminal is concentrated on the server, bottlenecks occur during data transmission, which may cause a reduction in work efficiency.

Also, for example, in a video production industry or a digital entertainment industry, a request for content data is generally made from a plurality of client terminals to a server in an attendance time zone of a creator at the same time. Therefore, in the attendance time zone, an access to the server is concentrated, and there are concerns that a data transfer rate to transmit the content data from the server to each client terminal will be significantly reduced. Also, in the server, it is necessary to routinely build and generate various assets or source files. Thus, in each client terminal, when a content data rendering operation or the like is finished and it comes to a quitting time zone of a creator, edited content data are simultaneously uploaded from the plurality of client terminals to the server. Therefore, in the quitting time zone, an access to the server is concentrated, and there are concerns that a data transfer rate to transmit the content data from each client terminal to the server will be significantly reduced. Thus, in the conventional client-server system, there has been a problem that traffic in an intranet or an external server increases and bottlenecks occur routinely.

Also, in the conventional client-server system, it is necessary to send data through the server even in the case of data transmission and reception between the respective client terminals. Therefore, in a case where a video having a large amount of data is transmitted between the respective client terminals or the number of connected clients is increased, there has been a problem that data traffic passing through the server is increased, and thus, data transmission slows down or bottlenecks occur.

Also, in the communication technology described in Patent Literature 1, each client terminal accesses the server and acquires content data in the server-client type communication, or specifies a client terminal capable of the P2P communication and acquires content data in the P2P type communication with the specified client terminal. However, in the technology of Patent Literature 1, the client terminal and the server, or the client terminal and the client terminal perform the content data transmission and reception in one-to-one relationship. As a result, in a case where traffic to a single information processing device is increased, there has been a problem that it is likely that data transmission will slow down or bottlenecks will occur. That is, in a case where communication is performed between the client terminals, the technology described in Patent Literature 1 is just intended to avoid the concentration of traffic on the server in the server-client type communication by transitioning from the server-client type communication to the P2P type communication. Therefore, it has been impossible to resolve a communication failure when data is transmitted from the server to the client terminal or from the client terminal to the client terminal.

Therefore, at present, in the server-client system, there is a need for a data transmission and reception system that can resolve a problem that traffic is concentrated on a server and bottlenecks occur when content data is distributed to each client terminal, and can increase speed of data transmission by distributing data to a client terminal requesting content data via multiple paths.

Solution to Problem

Therefore, as a result of intensive studies on means for resolving the problems of the conventional invention, the inventors of the present invention have found that it is possible to resolve bottlenecks where traffic is concentrated on the server and realize higher data transfer rates by means of multiple paths as follows: splitting content data into multiple pieces of data; when a client terminal requests downloading of certain content data, transmitting the split-up data of the corresponding content data from a server, which holds the corresponding content data, and other client terminal, where the split-up data of the corresponding content data remains in a cache region, to the client terminal via a P2P communication network; and reconstructing the content data in the client terminal. Then, based on the above knowledge, the inventors thought that it was possible to resolve the problems of the prior art, and completed the present invention.

Specifically, the present invention has the following configuration.

The present invention relates to a data transmission and reception system.

The data transmission and reception system of the present invention includes a server means configured by one or a plurality of server apparatuses, and a plurality of client terminals. The server means and the client terminals, and each of the plurality of client terminals are connected to be capable of data exchange via a communication network.

The server means includes a content storage unit, a data splitting unit, and a transmission unit.

The content storage unit stores one or a plurality of arbitrary content data. Examples of the content data are image data, video data, audio data, but are not limited these ones. Examples of the content data include various kinds of data that are stored and operated in the client terminals.

The data splitting unit has a function of generating split-up data by splitting the content data stored in the content storage unit.

The transmission unit of the server has a function of transmitting the split-up data generated by the data splitting unit to the client terminals.

On the other hand, each of the plurality of client terminals includes a server communication unit, a reception unit, and a cache region.

The server communication unit has a function of transmitting a request for downloading of the content data to the server means.

The reception unit has a function of downloading the split-up data of the content data transmitted from the server means according to the download request through the server communication unit.

The cache region has a function of temporarily storing the split-up data downloaded by the reception unit.

Also, the server means further includes a metadata database. The metadata database stores metadata regarding the split-up data stored in the cache region of each of the client terminals, and stores at least metadata regarding the split-up data stored in the cache region of the client terminal and regarding the client terminal, of which the cache region the split-up data is stored in, depending on the type of the split-up data.

Also, each of the plurality of client terminals includes a metadata acquisition unit, a P2P communication unit, a reconstruction unit, and a data storage unit.

The metadata acquisition unit has a function of, when the request for the downloading of the content data is transmitted to the server means, referring to the metadata database and acquiring information regarding other client terminal storing the split-up data of the corresponding content data, based on the metadata regarding the split-up data.

The P2P communication unit has a function for downloading the split-up data of the content data from the cache region of the corresponding other client terminal, based on the information regarding the other client terminal, which is acquired by the metadata acquisition unit.

The reconstruction unit has a function of reconstructing the content data by integrating both or either of the split-up data downloaded by the reception unit and the split-up data downloaded by the P2P communication unit.

The data storage unit stores the content data reconstructed by the reconstruction unit.

As described above, the data transmission and reception system of the present invention can transmit all or part of the content data from other client terminal storing the corresponding content data in the cache region, as well as the server means holding the content data, to the client terminal transmitting the download request, according to the request from the client terminal to download the content data. Therefore, it is possible to avoid concentration of the data transmission to the plurality of client terminals on one station in a specific server apparatus, and to resolve the problem of bottlenecks that occur during data transmission. Also, in a case where a certain client terminal requests data stored in the server means, if split-up data of the requested data is present in other client terminal near the client terminal, the split-up data can be used, and thus, it is unnecessary to acquire all the data from the server means. Hence, it is possible to reduce the load of the server means and reduce the bottlenecks on the communication path with the server means. Furthermore, in the data transmission and reception system of the present invention, the content data can be transmitted as the split-up data from the server means and other client terminal to the certain client terminal. Therefore, the present invention can enable the realization of higher data transfer rates because the client terminal requesting the content data is allowed to download the content data via the multiple paths.

In the present invention, the server means may be configured by a plurality of server apparatuses, and each of the plurality of server apparatuses may include a storage made by a redundancy of the content storage unit. In this case, the data splitting unit of the server means generates split-up data by splitting the content data stored in the storage, and the transmission unit of the server means transmits the split-up data generated by the data splitting unit to the client terminal according to the download request from the client terminal.

As described above, since the content storage unit storing the content data is made redundant and is stored in the storage of each of the server apparatuses, the split-up data of the content data can be transmitted from the plurality of server apparatuses to the client terminal requesting the content data. Therefore, since data stored redundantly in the storages of the plurality of server apparatuses are transmitted to the client terminal via the multiple paths, it is possible to resolve a problem that a speed until communication completion slows down due to a communication speed per connection. Furthermore, since the split-up data stored redundantly in the plurality of storage (for example, different blocks of the same file) are processed in parallel and are transmitted to the client terminal via the multiple paths, speed of data transmission can be further increased.

In the present invention, it is preferable that the server means is configured by a plurality of server apparatuses, and each of the plurality of server apparatuses includes a storage which stores split-up data generated by the data splitting unit. In this case, the transmission unit of the server means transmits the corresponding split-up data, which is stored in the storage storing the split-up data, to the client terminal according to the download request from the client terminal.

Therefore, since each of the plurality of server apparatuses includes the storage storing the split-up data of the content data, the content data can be transmitted to the client terminal via the multiple paths. Therefore, it is possible to prevent a reduction in a communication speed between the server means and the client terminal and to further increase speed of data transmission. Further, because it is sufficient to store only a part of the content data (split-up data), not all of the content data, in the storage of each of the server apparatuses, it is possible to save a storage capacity of the storage.

In the present invention, the distributing processing of the content data may be automated.

That is, first, each of the client terminals further includes an upload unit which uploads the content data, which is edited by the corresponding client terminal, to the content storage unit of the server means.

Also, the server means further includes a repository storage which stores information regarding the edited content data uploaded by each of the client terminals, and a build processing unit which performs build processing of the content data stored in the content storage unit, based on the information regarding the edited content data, which is stored in the repository storage. The build processing is processing of converting a source code file into an independent software product.

Each of the client terminals compares the content data, which is build-processed by the build processing unit of the server means, with the edited content data, and transmits a request for downloading of the edited content data to the server means through the server communication unit in case of a version of the build-processed content data is newer than a version of the edited content data.

Due to the above configuration, after the data editing operation is completed in the client terminal and the build processing is performed in the server means, the client terminal can download the latest version of data from the server means. For example, the access to the server means is relaxed on holidays or after the creators performing the editing operation (rendering, etc.) of the content data has left work. Therefore, if the latest version of the content data is distributed from the server means to each of the client terminals in time zones after work or on holidays, it is possible to resolve a problem that the access is concentrated on the server means in the attendance time zone of the creators. Also, for example, the server means performs build processing in the time zone after the creators have left work. If the client terminal determines that the content data is not latest as a result of comparing the product with the content data of each of the client terminals, the client terminal transmits a request for downloading of the latest content data. Therefore, the latest version of the content data can be distributed from the server means to each of the client terminals in the time zone when CPU utilization of the server means is lowered.

Also, the server means may further include a configuration management system which performs a version management of each of the content data, based on the information regarding the edited content data, which is stored in the repository storage. The configuration management system includes a difference extraction unit which, when the server means receives the request from the client terminal to download the content data, extracts difference data by comparing a version of the corresponding content data stored in the content storage unit of the server means with a version of the corresponding content data stored in the data storage unit of the corresponding client terminal. The configuration management system transmits the difference data extracted by the difference extraction unit to the client terminal through the transmission unit. In this case, the reconstruction unit of the client terminal reconstructs the content data by applying (performing patch application) the difference data transmitted from the transmission unit of the server means to the content data stored in the data storage unit.

In this manner, since the configuration management system of the server means compares the latest version of data stored in the server means with the content data stored in each of the client terminals and extracts a change position of binary unit as difference data, communication between the server means and the client terminals is completed by only the difference data, reducing the amount of data transmitted and resolving the bottlenecks that occur during transmission.

Advantageous Effects of Invention

As described above, according to the data transmission system of the present invention, it is possible to resolve failure that caused bottleneck by concentration of traffic on a server when content data is distributed to each of client terminals, and it is possible to increase speed of data transmission by distributing data to the client terminal requesting content data via multiple paths.

DESCRIPTION OF EMBODIMENT

Hereinafter, embodiments of the present invention will be described with reference to the drawings. The present invention is not limited to the embodiments described below and includes modifications appropriately made from the following embodiments within an obvious range by those skilled in the art.

(1. Data Transmission and Reception System)

Figure 1:
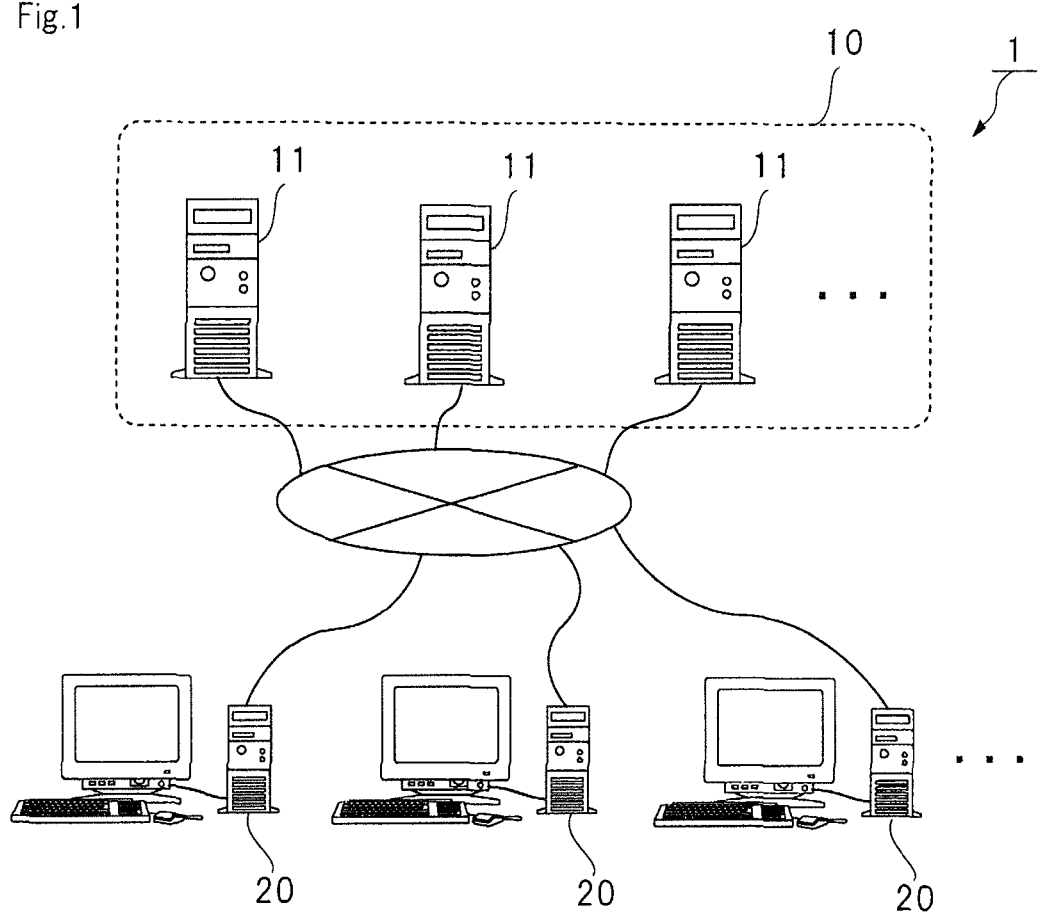
FIG. 1 is a diagram illustrating an overall configuration of a data transmission and reception system of the present invention.

FIG. 1 is a schematic diagram illustrating a system configuration of a data transmission and reception system according to the present invention. As illustrated in FIG. 1, the data transmission and reception system 1 includes a server means 10 configured by a plurality of server apparatuses 11, and a plurality of client terminals 20. The server means 10 and the plurality of client terminals 20 are connected to one another via a communication network. That is, each of the server apparatuses 11, the server apparatuses 11 and the client terminals 20, and each of the client terminals 20 can transmit and receive data with each other using the communication network. The data transmission and reception system of the present invention may be constructed by a network through the Internet, or may be constructed by an intra-network within a limited range, for example, within a company. In the data transmission and reception system 1, a communication between the server means 10 and the plurality of client terminals 20 may be performed by known wireless communication means as well as wired communication means.

Figure 2:
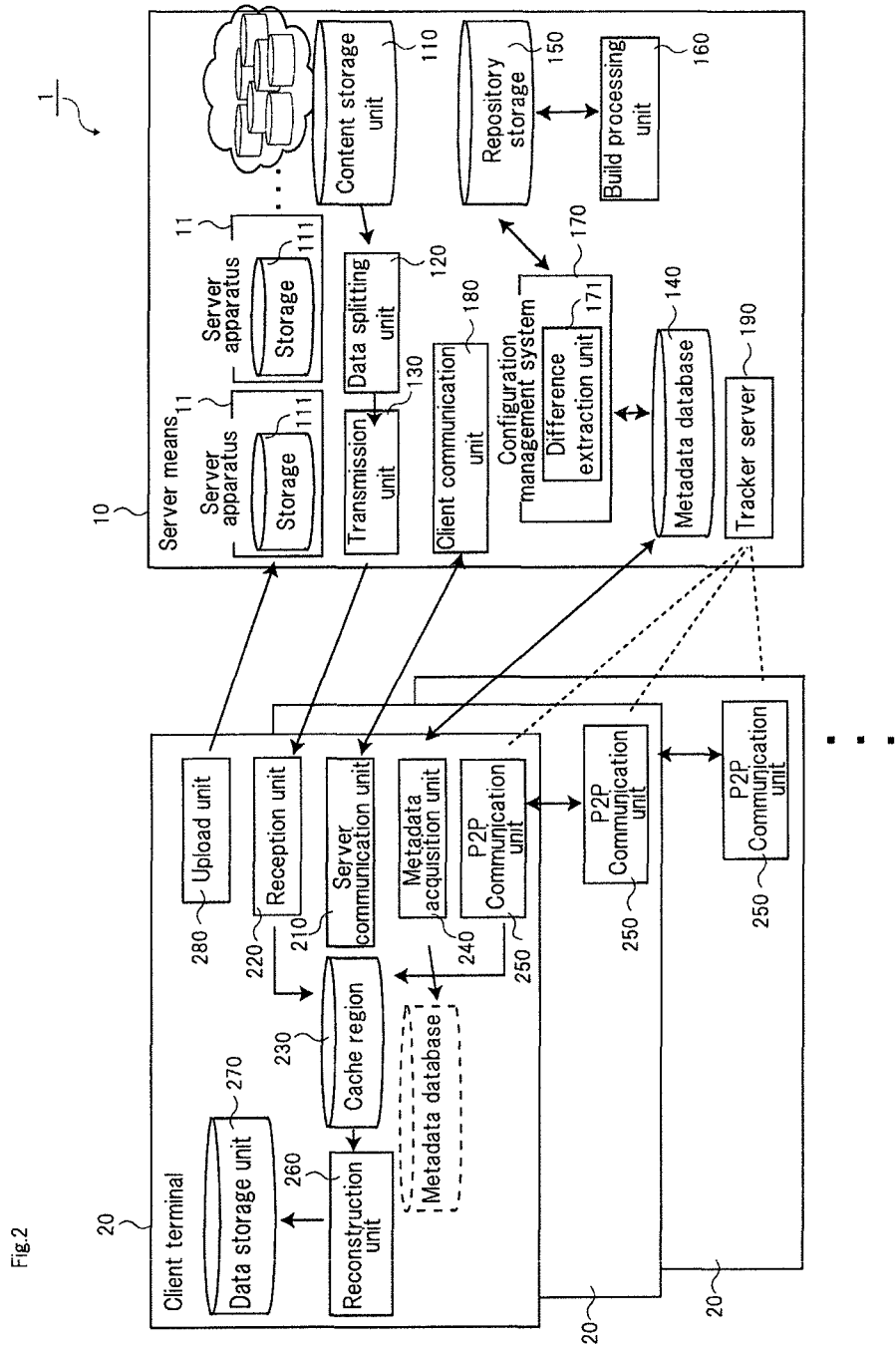
FIG. 2 is a block diagram illustrating an example of a configuration of a data transmission and reception system of the present invention.

FIG. 2 conceptually illustrates components constituting the server means 10 and the respective client terminals 20. The respective components illustrated in FIG. 2 are classified according to functions held by the server means 10 and the client terminals 20. Basically, each of the server apparatuses 11 constituting the server means 10 or each of the client terminals 20 include hardwares such as an input/output device, a control device, an arithmetic device, and a storage device, and these hardwares are connected by a bus or the like. That is, when predetermined information is input from the input device, the control device reads a control program stored in a main memory of the storage device. Also, the control device reads data stored in an appropriate storage unit according to a command of the control program, and the arithmetic device performs a predetermined operation. An operation result is temporarily stored in the storage device, so that information can be output from an output unit. Components included in the server means 10 and each of the client terminals 20, which are described below, are components for executing a predetermined function on a computer, by using the input/output device, the control device, the arithmetic device, and the storage device, etc.

Hereinafter, the configuration of each part of the server means 10 and the client terminals 20 included in the data transmission and reception system 1 will be described with reference to FIG. 2.

(1-1. Server Means)

The server means 10 has a function of distributing content data to each of the client terminals 20, and a function of managing a configuration of the data transmission and reception system or the content data. In the embodiment illustrated in FIG. 2, the server means 10 is configured by a plurality of sever apparatuses 11. Preferably, the server means 10 includes a content storage unit 110, a data splitting unit 120, a transmission unit 130, a metadata database 140, a repository storage 150, a build processing unit 160, a configuration management system 170, and a client communication unit 180, and can appropriately add other useful functions. These components constituting the server means 10 may be integrated into the single server apparatus 11, or may be functioned with being distributed in the plurality of server apparatuses 11.

As the server apparatuses 11 constituting the server means 10, known server apparatuses capable of providing predetermined processing or information according to a request from the client terminal 20 can be adopted. For example, as the server apparatuses 11, a UNIX server (registration trademark), a midrange server, or a mainframe server may be used as needed.

The content storage unit 110 stores arbitrary content data. In a case where the server means 10 is configured by the plurality of server apparatuses 11, the entity of the content storage unit 110 is configured by storages 111 of the plurality of server apparatuses 11 disposed over a plurality of nodes on a network. Examples of the content data stored in the content storage unit 110 are image data, video data, audio data, and text data, but are not limited these ones. They include various kinds of data that are input, stored, operated, or output to the client terminal. Examples of the content data may include a color moving picture file compressed by a moving picture experts group (MPEG) method, an audio file compressed by an MPEG audio layer 3 (MP3) method, or a color still picture file compressed by a joint photographic experts group (JPEG) method. Also, for example, in a game software development field, a source code or other digital content to be used for the development is stored in the content storage unit 110. The data stored in the content storage unit 110 is appropriately distributed according to a download request from the client terminal 20. The content storage unit 110, for example, may be configured by a set of a plurality of magnetic storage devices connected to a plurality of storage nodes, or may be configured by a single magnetic storage device.

The data splitting unit 120 splits the content data stored in the content storage unit 110 into multiple pieces of split-up data according to data type or data capacity. The data splitting unit 120, for example, splits the content data into split-up data (data blocks) each having a predetermined data amount. Also, for example, the split-up data may be generated by splitting the content data to have a predetermined data amount in order of serial transmission. For example, a data bus inside a CPU is connected to the data splitting unit 11, and predetermined data is provided from the content storage unit 110 through the data bus. The data splitting unit 120 separates a data bus width as a data block. Specifically, when parallel data is transmitted through the data bus inside the CPU, the data splitting unit 120 stores parallel data having a data amount corresponding to the data bus width in a data buffer as one split-up data. Also, the split-up data generated by the data 120 unit may be stored, in a distributed manner, in the storage 111 provided in each of the plurality of server apparatuses 11 constituting the server means 10.

The transmission unit 130 is an output unit for transmitting the split-up data generated by the data splitting unit 120 to the client terminals 20. In the transmission unit 130, a known interface can be adopted.

The metadata database 140 stores metadata regarding the split-up data stored in a cache region 230 of each of the client terminals 20 (hereinafter, referred to as split cache information). The metadata is information regarding information used for organizing information, and examples of the metadata include information (IP address) indicating a location of the client terminal 20 having the cache region 230 where the split-up data is stored, or information regarding a type of the split-up data. The configuration management system 170 of the server 20 periodically accesses each of the client terminals 20 through the client communication unit 180, acquires the metadata from the split-up data stored in the cache region 230 of each of the client terminals 20, and updates the metadata database 140. Therefore, the server means 10 or the client terminals 20 can find out the location of the split-up data with reference to the metadata stored in the metadata database 140.

The repository storage 150 stores information regarding edited content data uploaded from each of the client terminals. The repository storage 150 has a function of unifying various information of each process in software development and maintenance, and can store a product of each process of software development as meta information.

Therefore, the repository storage 150 is referenced during build processing to be described below. Also, the repository storage 150 can save programs in the server by a version management system. After copying and editing operation of the content data is completed, the client terminal 20 may upload the edited content data to the content storage unit 110, be committed to the repository storage 150, and store post-editing difference information in the repository storage. Therefore, by referencing the repository storage 150, it is possible to perform a version management of the respective content data. In the present embodiment, the version management of the respective content data is achieved by the configuration management system 170.

The build processing unit 160 performs build processing of the content data stored in the content storage unit 110 with reference to the repository storage 150. The build processing unit 160 reads the source code managed in the repository storage 150 and compiles the source code to a binary code, resulting in a conversion into an independent software product. For example, after compiling the source code to the binary code, processes of packaging the binary code, executing a test, deploying a production system, preparing documents or release notes, and the like are included in the build processing 160. The build processing may be performed in an arbitrary time zone by a system administrator, or may be automatically performed whenever a change in the source file is committed to the repository storage 150. In particular, it is preferable that the build processing is performed in a time zone such as at night when CPU utilization is lowered (a nightly build is performed).

The configuration management system 170 manages a function of performing a configuration management of the entire system, including a version management such as a latest version or a change history of the content data stored in the content storage unit 110, an acquisition of metadata of the split-up data stored in each of the client terminals 20, an updating of the metadata database 140, and the like. The configuration management system 170 includes, for example, a difference extraction unit 171. When the server means 10 receives a request from the client terminal 20 to download the content data, the difference extraction unit 171 may extract difference data by comparing the version of the content data stored in the content storage unit 110 of the server means 10 with the version of the corresponding content data stored in the corresponding client terminal 20, with reference to the repository storage 150. Preferably, the difference data is acquired in, for example, binary unit. In this manner, by extracting the difference data by the difference extraction unit 171, the configuration management system 170 may perform the version management of the content data by the difference data. However, the configuration management system 170 may perform the version management of the content data by generating actual data of the content data with respect to each version and storing the actual data.

The client communication unit 180 is used to exchange information with each of the client terminals 20. For example, the client communication unit is used to exchange information between the server means 10 and each of the client terminal 20 such as receipt a request from each of the client terminals 20 to download the content data. Also, for example, the request from each of the client terminals 20, which is received by the client communication unit 180, is transmitted to the configuration management system 170, and the configuration management system 170 transmits a processing command to each component of the server means 10.

The server means 10 may include a tracker server 190. The tracker server 190 is connected to allow exchange of information between P2P communication units 250 of the client terminals 20, and allocates an IP address to be used for the P2P communication to a new connector of the P2P communication network. That is, when the P2P communication is initiated, the client terminal 20 accesses the tracker server 190, receives the IP address, and starts transmitting data to and receiving data from other client terminal.

Also, it is preferable that each of the plurality of server apparatuses 11 constituting the server means 10 includes the storage 111 for storing the content data. It is preferable that the content data identical to that of the content storage unit 110 is stored and made redundant in each of the storages 111. Also, split-up data of the content data may be distributed and stored in each of the storages 111. Since each of the plurality of server apparatuses 11 is connected to each of the client terminals 20 via the communication network, the content data can be transmitted via the multiple paths according to the download request from the client terminal 20 by making the content data redundant or distributing and storing the content data in each of the storages 111.

(1-2. Client Terminal)

The client terminal 20 is connected to the server means 10 and has a function of performing an editing operation of the content data downloaded from the server means 10. The editing operation of the content data is performed by various applications that the client terminal 20 has. Also, in the present invention, the plurality of client terminals 20 is connected to one another by the P2P type communication, and can exchange data with one another. In the embodiment illustrated in FIG. 2, each of the client terminals 20 preferably includes a server communication unit 210, a reception unit 220 of the client terminal 20, the cache region 230, a metadata acquisition unit 240, a P2P communication unit 250, a reconstruction unit 260, a data storage unit 270, and an upload unit 280, and can appropriately add other useful functions.

The server communication unit 210 transmits a request for downloading of desired content data to the server means 10. That is, the client terminal 20 includes an input device, a control device, an arithmetic device, a storage device, and an output device. When the user of the terminal inputs a request for the downloading of the content data through the input device, the control device performs a predetermined operation in the arithmetic device according to a command of a control program stored in a main memory of the storage device, and transmits the download request to the server means 10 through the server communication unit 210 being an output unit. Also, the server communication unit 210 can transmit various other information to the server means 10. For example, the server communication unit 210 can transmit the request for the downloading of the metadata, which is stored in the metadata database of the server means 10, to the server means 10.

The reception unit 220 of the client terminal 20 can receive the split-up data of the content data transmitted from the server means 10. Also, the reception unit 220 of the client terminal 20, for example, may receive all split-up data constituting certain content data from the server means 10, or may receive content data being in a non-split state. The split-up data of the content data received by the reception unit 220 of the client terminal 20, for example, is temporarily stored in a cache memory (not illustrated).

The cache region 230 is an area of a storage device that temporarily stores the split-up data of the content data, which is downloaded from the server means 10 or other client terminal 20. The cache region 230, for example, is configured between a main storage device of the client terminal 20 and an arithmetic device such as a CPU, and data is input and output on behalf of the main storage device to be originally accessed by copying and holding attribute information such as data, state, or setting necessary for arithmetic processing of the arithmetic device. For example, in a case where there is a transmission request from the CPU and the data is already stored in the cache 230, the transmission from the main storage device is not performed, and the cache performs the transmission on behalf of the main storage device. Therefore, by temporarily storing the split-up data of the content data in the cache region 230, it is possible to read the requested split-up data from the cache region 230 and rapidly perform the data transmission when the corresponding split-up data is requested from other device.

When the request for the downloading of the content data is transmitted to the server means 10, the metadata acquisition unit 240 acquires information (split cache information) regarding other client terminal storing the split-up data of the content data, based on the metadata stored in the metadata database 140. The split cache information used herein includes information for grasping the location of other client terminal. Specifically, the split cache information includes information such as an IP address of other client terminal in the P2P communication. The metadata acquisition unit 20 may grasp the location of other client terminal storing the split-up data of the content data by acquiring a part of the metadata stored in the metadata database 140 of the server means 10, or may acquire all of the metadata stored in the metadata database 140 of the server means 10. In a case where the metadata acquisition unit 240 acquires all of the metadata stored in the metadata database 140 of the server means 10, a metadata database may also be constructed in the client terminal 20. By constructing the metadata database in the client terminal 20, other client terminal 20 can acquire split cache information, without accessing the server means 10.

The P2P communication unit 250 has a function of enabling the P2P communication between a certain client terminal 20 and another client terminal 20. In the P2P communication, each of the client terminals (peers) connected to the network operates as a server by providing a predetermined service to other peer on one occasion, and operates as a client by using the service provided by other peer on one occasion, and the respective peers have an equal relationship. When performing communication in the respective client terminals 20, the P2P communication unit 250 starts a common communication application that the respective client terminals 20 have, and connects the respective client terminals 20 by using a communication path provided between the respective client terminals 20. Other client terminal 20, which receives a request from a certain client terminal 20 to download the split-up data, reads the split-up data from the cache region 230, and transmits the split-up data to the certain client terminal 20 through the P2P communication unit 250. The connection mode of the P2P communication may be a one-to-one type communication which performs one-to-one communication between the client terminals, or may be a broadcasting type communication which forms a tree structure by making a node connection between the client terminals in a cascade-shaped multilayer configuration.

Such a P2P communication network can be constructed in the Internet or the intranet, and grasps the locations of the terminals by using the IP addresses allocated to the respective client terminals 20. The P2P communication can connect the plurality of client terminals to one another. In this case, the client terminals may be connected to one another via the communication path being the shortest path. The P2P communication unit 235 mutually transmits and receives the split-up data stored in the cache region 230 of one client terminal 20 or the plurality of client terminals 20 by the P2P communication, based on the split cache information acquired by the metadata acquisition unit 240. The split cache data received by the P2P communication unit 235 is temporarily stored in the cache region 230.

The reconstruction unit 260 reads from the cache region 230 the split-up data received from the server means 20 by the reception unit 220 of the client terminal 20 and/or the split-up data received from other client terminal by the P2P communication unit 250, and reconstructs the content data by integrating the read split-up data. The content data reconstructed by the reconstruction unit 260 is stored in the data storage unit 270.

Also, the client terminal 20 includes the upload unit 280 that uploads edited content data, which has undergone a predetermined editing operation, to the content storage unit 110 of the server means 10. That is, the client terminal 20 can appropriately read the content data stored in the data storage unit 270 according to a command of the control program, and perform editing processing of the content data by running a rendering application or the like. The upload unit 280 can upload the edited content data to the content storage unit 110 of the server means 10. Regarding the edited content data uploaded to the content storage unit 110, the meta information in each process of software development is stored in the repository storage 150, and the version management such as the latest version or the change history of the content data is performed by the configuration management system 170 of the server means 10.

(2. Processing Flow of Data Transmission and Reception System)

Figure 3:
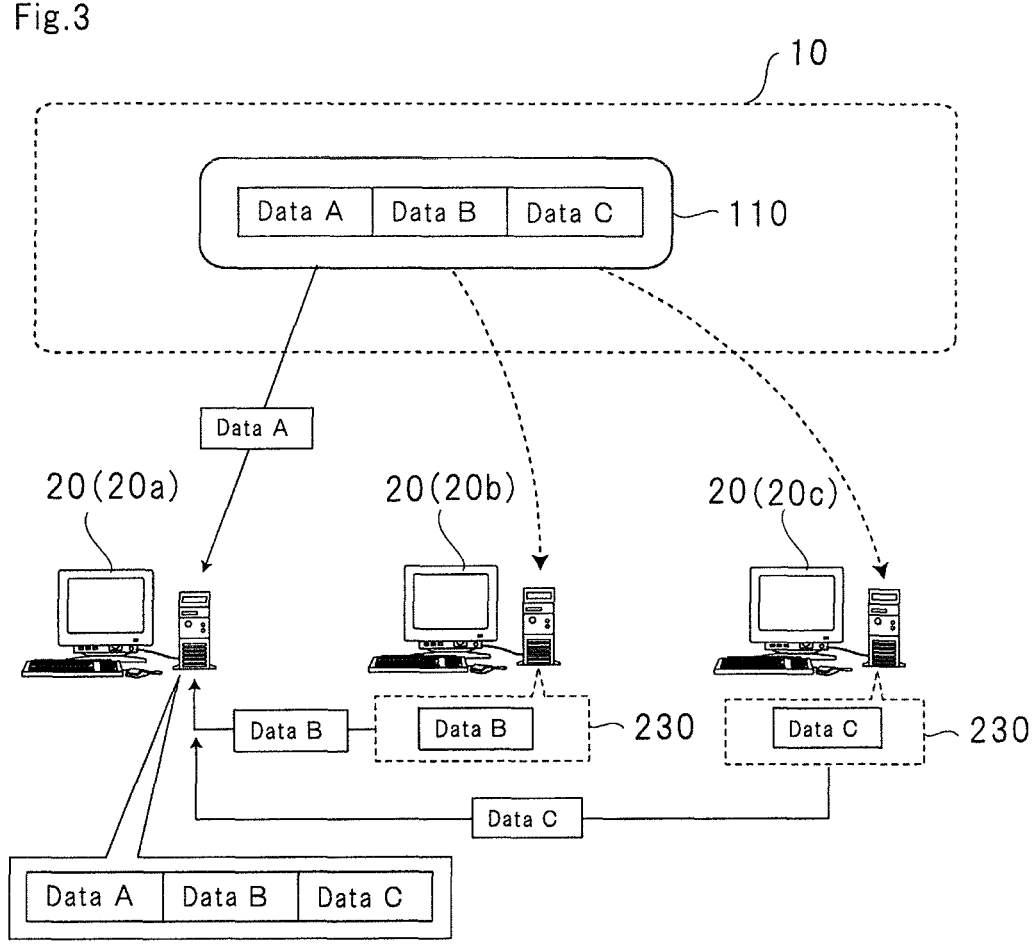
FIG. 3 is a diagram schematically illustrating a data flow according to an embodiment of the present invention.
Figure 4:
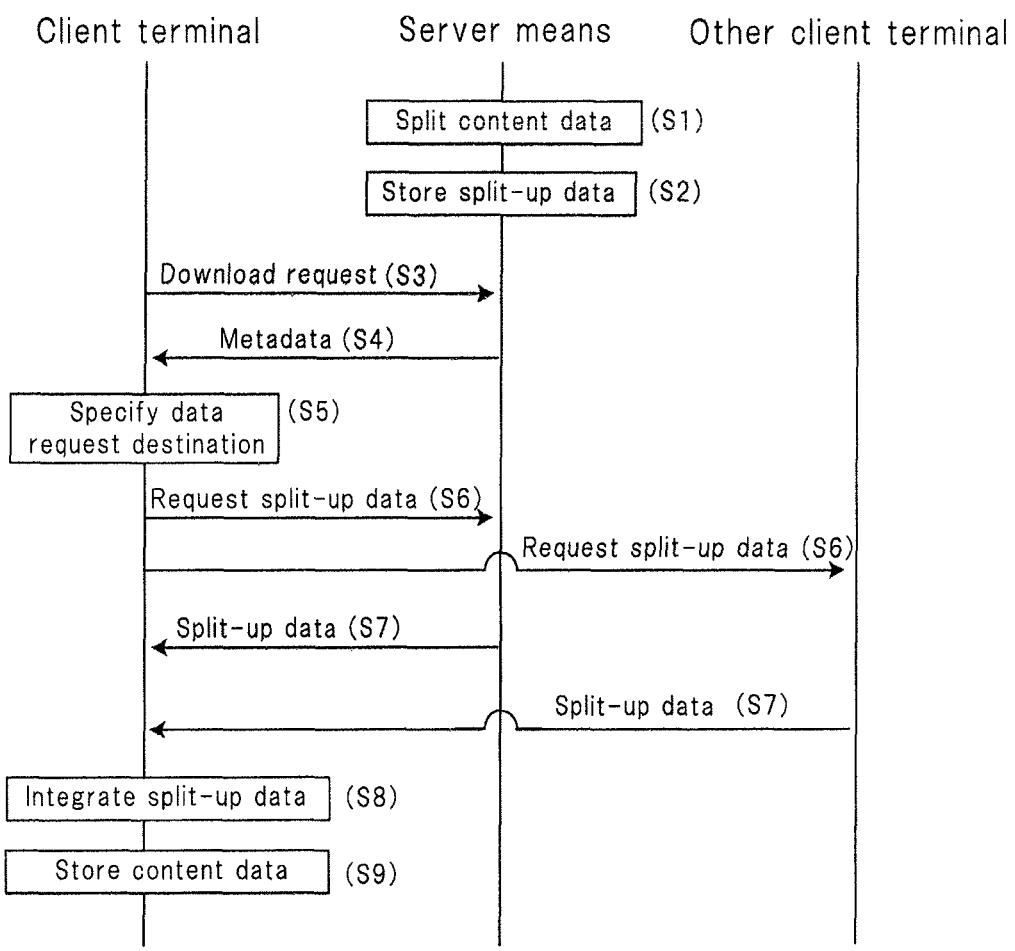
FIG. 4 is a flowchart illustrating processing according to an embodiment of the present invention.

Next, a processing flow of the data transmission and reception system according to an embodiment of the present invention will be described with reference to FIGS. 3 and 4. First, FIGS. 3 and 4 illustrate the processing flow of the transmission and reception system in a certain embodiment. FIG. 3 conceptually illustrates the flow of data transmission and reception, and FIG. 4 illustrates an example of the flowchart of the system.

As illustrated in FIG. 4, the server means 10 splits content data in advance by the data splitting unit 120 (step S1). The split-up data split by the splitting unit 120 is stored in the content storage unit 110 (step S2). For example, as illustrated in FIG. 3, certain content data is split into pieces of data, that is, data A, data B, and data C, and the split-up data are stored in the content storage unit 110.

As illustrated in FIG. 4, a certain client terminal 20 transmits a request for the downloading of the content data to the server means 10 through the server communication unit 210 (step S3). For example, in the example illustrated in FIG. 3, a certain client terminal 20a that is out of a plurality of client terminals transmits a request for the downloading of the content data including data A, data B, and data C to the server means 10.

As illustrated in FIG. 4, when transmitting the request for the downloading of the content data to the server means 10, the client terminal 20a refers to the metadata database 140 of the server means 10 and acquires the split cache information by the metadata acquisition unit 240, based on the metadata stored in the metadata database 140 (step S4).

The split cache information is information regarding other client terminal storing the split-up data of the desired content data. For example, the split cache information includes information such as an IP address of other client terminal in the P2P communication.

In the example illustrated in FIG. 3, the split-up data of the content data, to which a download request is made by the client terminal 20a, is held by other client terminals 20b and 2c besides the server means 10. That is, in the example illustrated in FIG. 3, data B is stored in the cache region 230 of other client terminal 20b, and data C is stored in the cache region 230 of other client terminal 20c. These pieces of information are stored in the metadata database 140 as split cache information. Therefore, by acquiring the split cache information from the metadata database 140, the client terminal 20a can grasp the location of other client terminal 20b holding data B and the location of other client terminal 20e holding data C.

Next, as illustrated in FIG. 4, the client terminal 20 specifies a request destination of the split-up data, based on the split cache information (step S5). Then, the client terminal 20 transmits a request for the downloading of the split-up data to the specified request destination (step S6). Basically, in order to prevent traffic from increasing to the server means 10, it is preferable that a request for the downloading of the split-up data held by the client terminal 20 is preferentially transmitted to the corresponding client terminal. Therefore, basically, it is preferable that when other client terminal holds the split-up data, the client terminal 20 preferentially transmits a request for the downloading of the corresponding split-up data to the corresponding other client terminal, and, with respect to split-up data that other client terminal does not hold, the client terminal 20 transmits a request for the downloading of the split-up data to the server means 10.

However, the client terminal 20, for example, can determine whether other client terminal holding the split-up data is in a P2P communicable state or whether a connection distance between the client terminal itself and other client terminal is short, based on the split cache information. Referring to the example of FIG. 3, in a case where the client terminal 20a determines that P2P communication with other client terminal 20c is in a disabled state, like a case where power of other client terminal 20c is off, the client terminal 20a may transmit a request for the downloading of the split-up data (data C), which is held by other client terminal 20c, to the server means 10. Also, for example, the client terminal 20a grasps a connection distance between the client terminal 20a and other client terminal 20c by the number of nodes having been passed through when the client terminal 20a and other client terminal 20c are connected. When it is determined that the connection distance between the client terminal itself and other client terminal 20c is equal to or more than a predetermined distance, the client terminal 20a may transmit a request for the downloading of the split-up data (data C), which is held by other client terminal 20c, to the server means 10. In this case, the client terminal 20a may compare a time necessary for receiving the split-up data (data C) from other client terminal 20c with a time necessary for receiving the split-up data (data C) from the server means 10, and transmit a request for the downloading of the split-up data (data C) to the client terminal 20c or the server means 10 determined as having a shorter time necessary for receiving the split-up data (data C).

As illustrated in FIG. 4, the server means 10 and/or other client terminal 20, which receive/receives the request from the client terminal 20 to download the split-up data, transmit/transmits the download-requested split-up data to the corresponding client terminal 20 (step S7). For example, referring to the example of FIG. 3, the server means 10, which receives the request from the client terminal 20a to download the split-up data (data A), reads the split-up data (data A) from the content storage unit 110 and transmits the split-up data (data A) to the client terminal 20a through the transmission unit 130. Also, other client terminal 20b, which receives the request from the client terminal 20a to download the split-up data (data B), reads the data B from the cache region 230 and transmits the data B to the client terminal 20a through the P2P communication unit 250. In a similar manner, other client terminal 20c, which receives the request from the client terminal 20a to download the split-up data (data C), reads the data C from the cache region 230 and transmits the data C to the client terminal 20a through the P2P communication unit 250. Also, in the example illustrated in FIG. 3, the client terminal 20a downloads the split-up data (data A, B and C) from the server means 10 and other client terminals 20b and 20c, respectively, but the client terminal 20a can collectively download the split-up data (data A, B and C) from the server means 10 or other single client terminal. The client terminal 20a temporarily stores the split-up data downloaded from the server means 10 and/or other client terminal 20 in the cache region 230.

Next, in the client terminal 20, the reconstruction unit 260 integrates the split-up data downloaded from the server means 10 and/or other client terminal 20 and reconstructs the content data (step S8). Then, the client terminal 20 stores the reconstructed content data in the data storage unit 270 (step S9). In this manner, the client terminal 20 can acquire desired content data.

As described above, the data transmission and reception system of the present invention transmits all or part of the content data from other client terminal storing the corresponding content data in the cache region, as well as the server means holding the content data, to the client terminal transmitting the download request, according to the request from the client terminal to download the content data. Therefore, it is possible to avoid concentration of the data transmission to the plurality of client terminals on one station in a specific server apparatus, and to resolve the problem of bottlenecks that occur during data transmission. Also, in a case where a certain client terminal requests data stored in the server means, if split-up data of the requested data is present in other client terminal near the client terminal, the split-up data can be used, and thus, it is unnecessary to acquire all the data from the server means. Hence, it is possible to reduce the load of the server means and reduce the bottlenecks on the communication path with the server means. Furthermore, since the content data can be transmitted from the server means and other client terminal to a certain client terminal as the split-up data, the client terminal requesting the content data can download the content data via the multiple paths, thereby enabling the realization of higher data transfer rates.

(2-1. Redundancy/Distribution)

Next, a preferred embodiment of the data transmission and reception system will be described.

Figure 5:
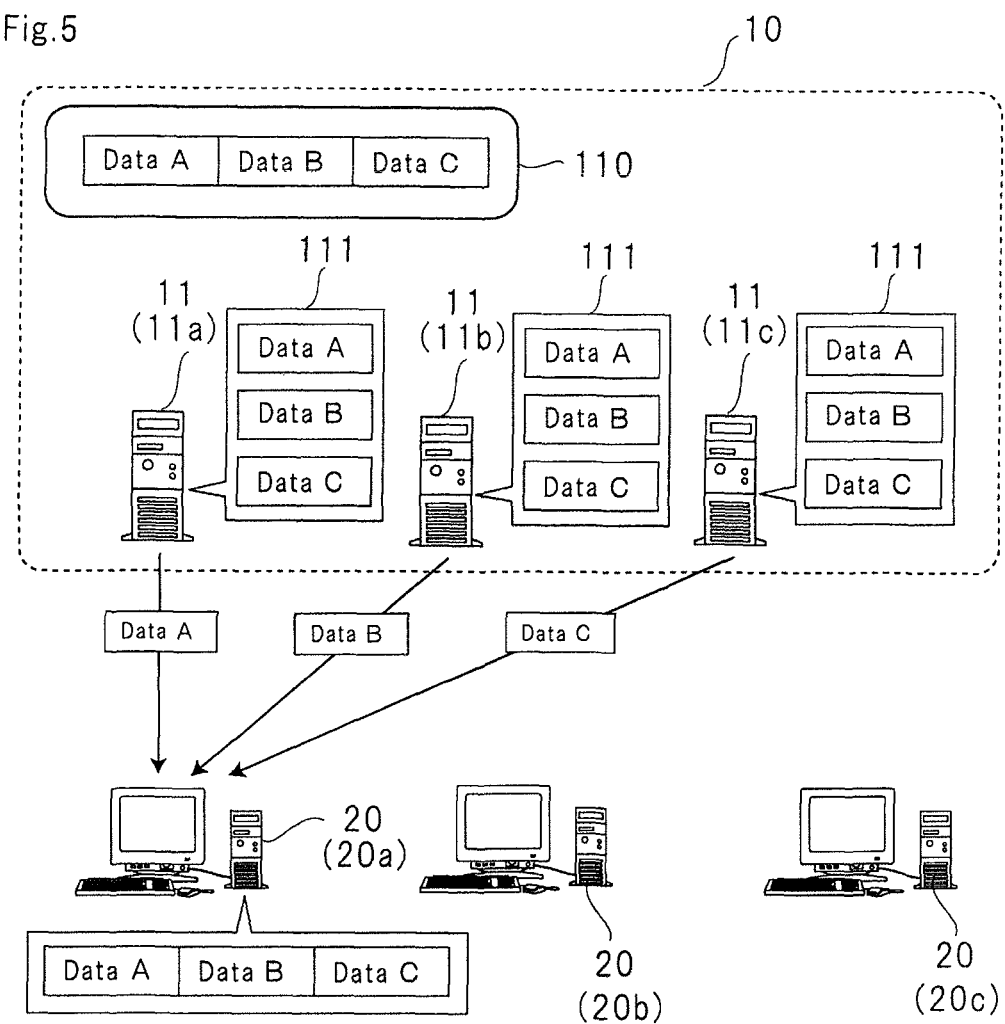
FIG. 5 is a diagram schematically illustrating a data flow according to another embodiment of the present invention.

FIG. 5 illustrates an example in which the plurality of server apparatuses 11 constituting the server means 10 includes a storage 111 made by a redundancy of a content storage unit 110. In the example illustrated in FIG. 5, content data including data A, data B, and data C is stored in the content storage unit 110. The content storage unit 110 is made redundant, and the content data including data A, data B, and data C is also stored in the storage 111 of each of the server apparatuses 11.

As illustrated in FIG. 5, the content data stored in the storage 111 of each of the server apparatuses 11 is split into pieces of data, that is, data A, data B, and data C by a data splitting unit 130. The plurality of server apparatuses 11 and a plurality of client terminals 20 are connected to one another by a communication network. Therefore, when the client terminal 20a requests the downloading of the content data including data A, data B, and data C, the server means 10 transmits the split-up data of the content data to the client terminal 20a according to the download request. In this case, the server means 10 can transmit the split-up data of the content data to the client terminal 20a through the plurality of server apparatuses 11. For example, as illustrated in FIG. 5, data A is transmitted from the server apparatus 11a to the client terminal 20a. Also, data B is transmitted from the server apparatus 11b to the client terminal 20a. In a similar manner, data C is transmitted from the server apparatus 11c to the client terminal 20a. In this manner, since the storages 111 made by the redundancy of the content storage unit 110 are provided in the plurality of server apparatuses 11, the content data stored redundantly in the storages 111 can be transmitted to the client terminal 20 via the multiple paths. Therefore, it is possible to resolve a problem that a speed until communication completion slows down due to a communication speed per connection. Also, since the split-up data of the content data can be transmitted to the client terminal 20 through parallel processing and multiple paths, speed of communication processing can be further increased.

Figure 6:
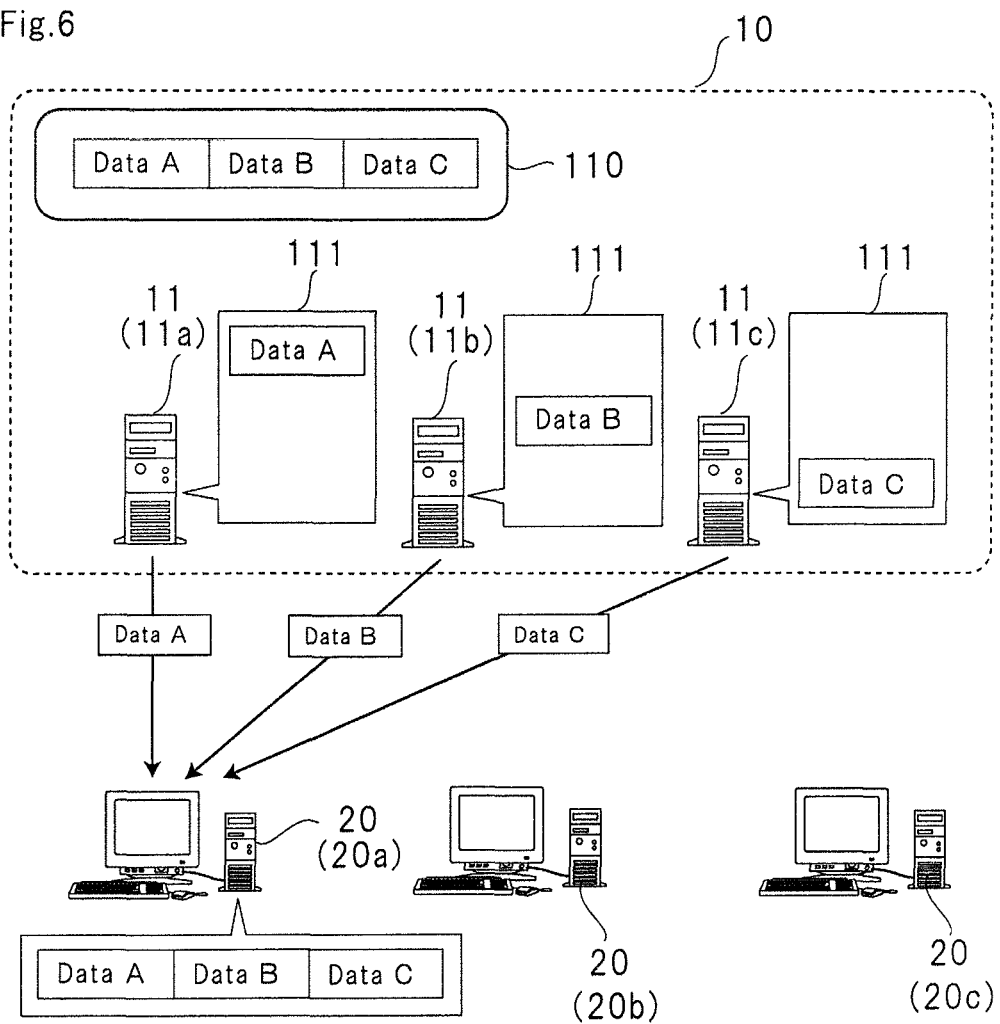
FIG. 6 is a diagram schematically illustrating a data flow according to another embodiment of the present invention.

FIG. 6 illustrates an example in which content data stored in a content storage unit 110 is distributed and stored in storages 111 of a plurality of server apparatuses 11 constituting a server means 10. In the example illustrated in FIG. 5, content data including data A, data B, and data C is contained in the content storage unit 110. The content data of the content storage unit 110 is split by a data splitting unit 120, and split-up data are distributed and stored in the storages 111 of the respective server apparatuses 11. That is, in the example illustrated in FIG. 5, data A, data B, and data C are stored in the storage 111 of the server apparatus 11a, the storage 111 of the server apparatus 11b, and the storage 111 of the server apparatus 11c, respectively.

In this case, when a certain client terminal 20a requests the downloading of the content data including data A, data B, and data C, the server means 10 transmits the split-up data of the content data to the client terminal 20a according to the download request. At this time, the server means 10 transmits the split-up data of the content data to the client terminal 20a through the plurality of server apparatuses 11. For example, as illustrated in FIG. 5, data A is transmitted from the server apparatus 11a to the client terminal 20a. Also, data B is transmitted from the server apparatus 11b to the client terminal 20a. In a similar manner, data C is transmitted from the server apparatus 11c to the client terminal 20a. In this manner, since the split-up data of the content data are distributed and stored in the storages 111 of the plurality of server apparatuses 11, the content data stored in the storages 111 of the plurality of server apparatuses 11 can be transmitted to the client terminal 20 via the multiple paths. Therefore, it is possible to resolve a problem that a speed until communication completion slows down due to a communication speed per connection. Also, since the split-up data of the content data can be transmitted to the client terminal 20 through parallel processing and multiple paths, speed of communication processing can be further increased.

As described above, it is preferable that the storing of the content data in the content storage unit 110 is made redundant and/or distributed over the plurality of server apparatuses 11. The redundancy and the distribution of the storing of the content data are not mutually exclusive, and the server apparatus 11 storing the content data in a redundant manner and the server apparatus 11 storing the content data in a distributed manner may coexist. Also, even when the storing of the content data is made redundant and/or distributed, the client terminal 20 requesting the downloading of the content data can acquire the split-up data from other client terminal 20 via the P2P communication network.

(2-2. Automatic Distribution of Content Data)

Next, processing flow for automatically distributing the latest content data to the client terminal will be described with reference to FIG. 7.

Figure 7:
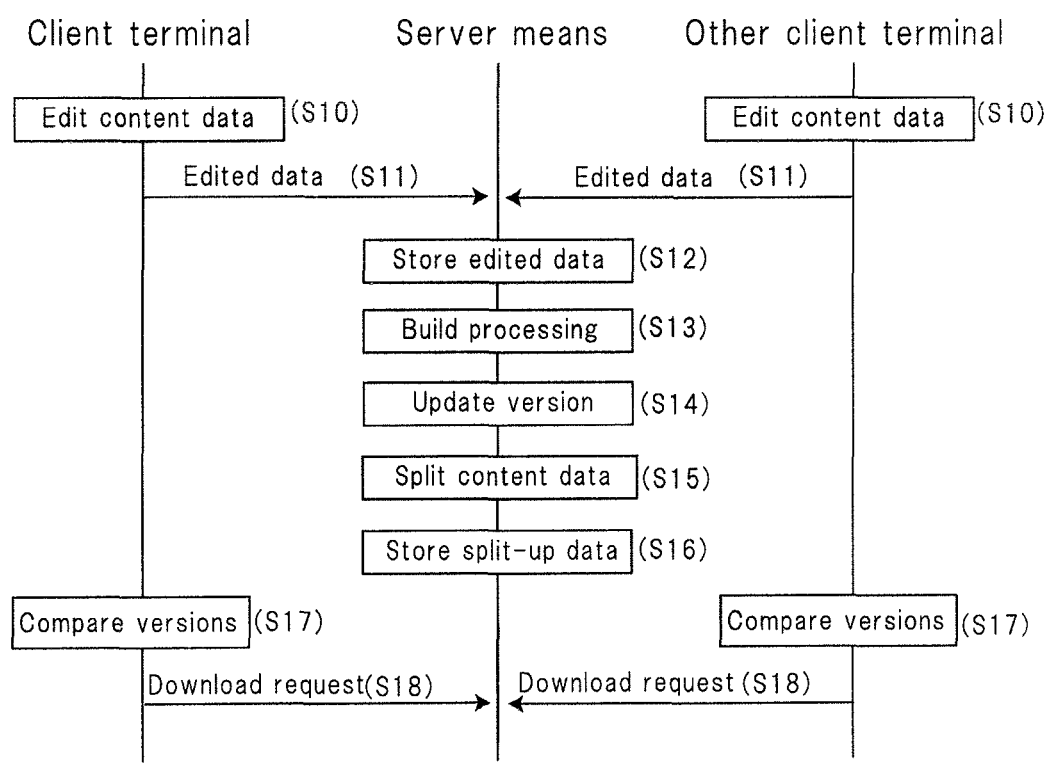
FIG. 7 is a flowchart illustrating processing according to another embodiment of the present invention.

As illustrated in FIG. 7, each of the plurality of client terminals included in the present system reads the content data stored in the data storage unit 270 and edits the read content data (step S10). The edited content data are integrated into the server means 10, and the version management such as the latest version or the change history is performed by the configuration management system 170. Therefore, each of the client terminals included in the present system uploads the edited content data to the server means 10 through the upload unit 280 (step S11).

The edited content data uploaded by each of the client terminals 20 is stored in the content storage unit 110 of the server means 10 (step S12). Also, at this time, regarding the edited content data uploaded to the server means 10, a product such as a source code generated in each process of software development is stored in the repository storage 150. Also, when committed to the repository storage 150, difference information of the edited content data is updated to the repository storage. Therefore, the configuration management system 170 can perform the version management of the content data with reference to the repository storage 150.

Next, a build processing unit 160 performs build processing of the content data stored in the content storage unit 110 with reference to the repository storage 150. The build processing unit 160 reads the source code managed in the repository storage 150 and compiles the source code to a binary code, resulting in a conversion into an independent software product. For example, after compiling the source code to the binary code, processes of packaging the binary code, executing a test, deploying a production system, preparing documents or release notes, and the like are included in the build processing 160. The build processing may be performed in an arbitrary time zone by a system administrator, or may be automatically performed whenever a change in the source file is committed to the repository storage 150. In particular, it is preferable that the build processing is performed in a time zone such as at night when CPU utilization is lowered (a nightly build is performed).

The configuration management system 170 stores the build-processed content data again in the content storage unit 110 and updates the version of the content data with the latest version (step S14). In this case, the configuration management system 170 may perform the version management of the content data by difference data. The configuration management system 170 may also perform the version management of the content data by generating actual data of the content data with respect to each version and storing the actual data.

After that, as in steps S1 and S2, the server means generates split-up data by splitting the content data stored in the content storage unit 110 by the data splitting unit 120, and stores the split-up data (step S15, step S16).

Then, each of the client terminals 20 compares the version of the edited content data stored in its own data storage unit 270 with the version of the build-processed content data stored in the content storage unit 110 of the server means 10 (step S17). As described above, since the version management of the content data is performed by the configuration management system 170, each of the client terminals 20 can access the configuration management system 170 and grasp the difference between the version of the edited content data and the version of the build-processed content data. The comparison processing may be automatically performed by each of the client terminals 20 when the server means 10 transmits build-processing-completed information to each of the client terminals 20 and each of the client terminals 20 receives the completion information. Also, a time to perform the comparison processing on each of the client terminals is managed by the configuration management system 170, and the comparison processing may be started in different time zones with respect to each of the client terminals according to a command of the configuration management system 170.

As a result of the comparison processing, when each of the client terminals 20 determines that the version of the built-processed content data stored in the content storage unit 110 of the server means 10 is newer than the version of the edited content data stored in its own data storage unit 270, each of the client terminals 20 requests the server means 10 for the downloading of the latest version of the content data (step S18). Then, the same processing as steps S4 to S9 described in FIG. 4 is performed. Therefore, after uploading the edited content data, each of the client terminals 20 can automatically download the latest version of the content data. For example, by performing the build processing in a time zone such as at night when CPU utilization is lowered, the latest version of the content data is distributed to each of the client terminals 20 at night. Therefore, for example, it is possible to make a situation where when a creator performing the editing operation of the content data comes to work, the latest version of the necessary content data has already been downloaded to his/her own client terminal.

(2-3. Use of Difference Data)

Next, processing flow for distributing difference data of the content data to the client terminal will be described with reference to FIG. 8. It is possible to reduce an amount of data transmitted and resolve bottlenecks occurring during transmission by extracting difference data between the content data stored in the data storage unit 270 of each of the client terminals 20 and the content data stored in the content storage unit 110 of the server means 10 and transmitting only the difference data to the client terminal.

Figure 8:
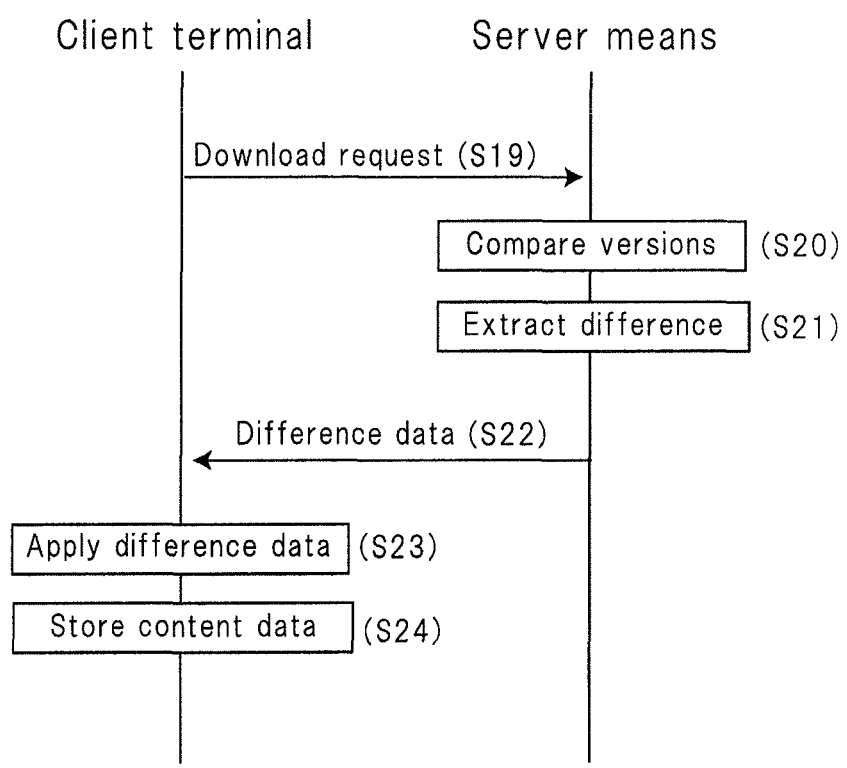
FIG. 8 is a flowchart illustrating processing according to another embodiment of the present invention.

As illustrated in FIG. 8, the client terminal 20 requests the server means 10 for the downloading of the desired content data (step S19). The server means 10 receiving the request for the downloading of the content data compares the version of the corresponding content data stored in the content storage unit 110 of the server means 10 with the version of the corresponding content data stored in the data storage unit 270 of the corresponding client terminal (step S20). At this time, when the content data, which is subject to the download request, is absent in the data storage unit 270 of the client terminal 20, steps S4 to S9 of the processing flow illustrated in FIG. 4 are performed.

On the other hand, when the content data, which is subject to the download request, is already present in the data storage unit 270 of the client terminal 20, the configuration management system 170 of the server means 10 extracts difference data between the content data stored in the content storage unit 110 of the server means 10 and the content data stored in the data storage unit 270 of the client terminal in, for example, binary unit by the difference extraction unit 171 (step S21). The difference data extracted by the difference extraction unit 171 temporarily stores in a cache memory (not illustrated).

Then, the server means 10 transmits only the difference data extracted by the difference extraction unit 171 to the client terminal 20 through the transmission unit 130 (step S22).

The client terminal 20 receiving the difference data applies the received difference data to the content data stored in the data storage unit by the reconstruction unit 260 (step S23). Therefore, it is possible to update a part of the content data that the client terminal 20 stores, based on the received difference data. The content data, to which patch is applied, is stored in the data storage unit 270 of the client terminal 20.

By performing content data update processing using the difference data, transmission bottlenecks can be resolved because it is possible to reduce an amount of data transmitted between the server means 10 and the client terminal 20 when downloading the content data, without any cost for pre-processing or post-processing in a CPU. Also, for example, when the content data, which is subject to the download request, is absent in the data storage unit 270 of the client terminal 20, the typical download processing illustrated in FIG. 4 is performed. On the other hand, when the content data, which is subject to the download request, is already present in the data storage unit 270 of the client terminal 20, the transmission processing of only the difference data illustrated in FIG. 8 is performed. In this manner, the data transmission becomes efficient. Therefore, data can be transmitted at a high speed, without the system user's consciousness.

In the present specification, the embodiments of the present invention have been described with reference to the drawings in order to express the contents of the present invention. However, modifications or improvements made based on the matters described in the present specification by those skilled in the art fall within the scope of the present invention, as long as the modifications or improvements do not depart from the intent of the present invention.

REFERENCE SIGNS LIST

1 data transmission and reception system
10 server means
11 server apparatus
111 storage
110 content storage unit
120 data splitting unit
130 transmission unit
140 metadata database
150 repository storage
160 build processing unit
170 configuration management system
171 difference extraction unit
180 client communication unit
20 client terminal
210 server communication unit 220 reception unit
230 cache region
240 metadata acquisition unit
250 P2P communication unit
260 reconstruction unit
270 data storage unit
280 upload unit

The invention claimed is:

1. A data transmission and reception system, in which a server, and a first client terminal and a second client terminal are connected to perform data exchange via a communication network, wherein the server comprises:
a memory configured to store content data;
a processor configured to split the content data into first split-up data and second split-up data to be stored in the memory, the first split-up data including a different portion of the content data than the second split-up data; and
a transmitter configured to selectively transmit at least one of the first split-up data and the second split-up data according to a download request for downloading of the content data, each of the first client terminal and the second client terminal comprises:
a transmitter configured to transmit, to the server, a download request for downloading of the content data;
a receiver configured to receive, from the server, at least one of the first split-up data and the second split-up data of the content data according to the download request; and
a cache memory configured to temporarily store the one of the first split-up data or the second split-up data received by the receiver, the memory of the server is further configured to store metadata of the first split-up data and the second split-up data stored in the cache memory of each of the first client terminal and the second client terminal, respectively, the first client terminal further comprises:
a processor configured to, when transmitting the download request to the server, refer to the metadata stored in the memory of the server and acquire storage information of the second client terminal, when the storage information of the second client terminal indicates storage of the second split up data, the receiver of the first client terminal receives, over a P2P network, the second split-up data from the cache memory of the second client terminal and receives the first split-up data from the memory of the server, when the storage information of the second client terminal indicates not storing both the first and second split up data, the receiver of the first client terminal receives, over the P2P network, both the first and second split-up data from the memory of the server, the processor of the first client terminal is further configured to reconstruct the content data by integrating the first split-up data and the second split-up data, and the first client terminal further comprises a memory configured to store reconstructed content data.

2. The data transmission and reception system according to claim 1, wherein the server comprises a plurality of server apparatuses having a same configuration as the server.

3. The data transmission and reception system according to claim 1, wherein the server comprises a plurality of server apparatuses, and
at least one of the plurality of server apparatuses comprises:
a memory configured to store at least one of the first split-up data and the second split-up data generated by the processor of the server; and
a transmitter configured to transmit the at least one of the first split-up data and the second split-up data, to at least one of the first client terminal and the second client terminal.

4. The data transmission and reception system according to claim 1, wherein the processor of the first client terminal is further configured to edit the reconstructed content data stored in the memory of the first client terminal,
the transmitter of the first client terminal is further configured to upload the edited content data the server,
the memory of the server is further configured to store information of the edited content data uploaded from the first client terminal,
the processor of the server is further configured to perform a build processing of the content data stored in the memory of the server, based on the information of the edited content data stored in the memory of the server, and store the build-processed content data as a newer version of the content data, and
the second client terminal compares a version of content data stored in the second client terminal with a version of the content data stored on the server, and transmits, to the server, a request for downloading of the version of the content data stored on the server when the version of the content data stored in the server is newer than the version of the content data stored in the second client terminal.

5. The data transmission and reception system according to claim 1, wherein the processor of the first client terminal is further configured to edit the reconstructed content data stored in the memory of the first client terminal,
the transmitter of the first client terminal is further configured to upload, to the server, the edited content data,
the memory of the server is further configured to store information regarding the edited content data uploaded from the first client terminal,
the processor of the server is further configured to perform a version management of the content data based on the information regarding the edited content data stored in the memory of the server,
when the server receives a request from the second client terminal to download the content data, the processor of the server is further configured to extract difference data by comparing a version of the content data stored in the memory of the server with a version of the content data stored in the memory of the second client terminal,
the transmitter of the server is configured to transmit, to the second client terminal, the difference data,
the processor of the second client terminal is further configured to reconstruct the content data by applying the difference data, and
the content data reconstructed by applying the difference data is a same version of the content data stored in the memory of the server.

* * * * *